No. 689,145. Patented Dec. 17, 1901.
F. B. TURNER.
ENGINE FOR STEERING VESSELS.
(Application filed Apr. 16, 1901.)
(No Model.) 2 Sheets—Sheet 1.
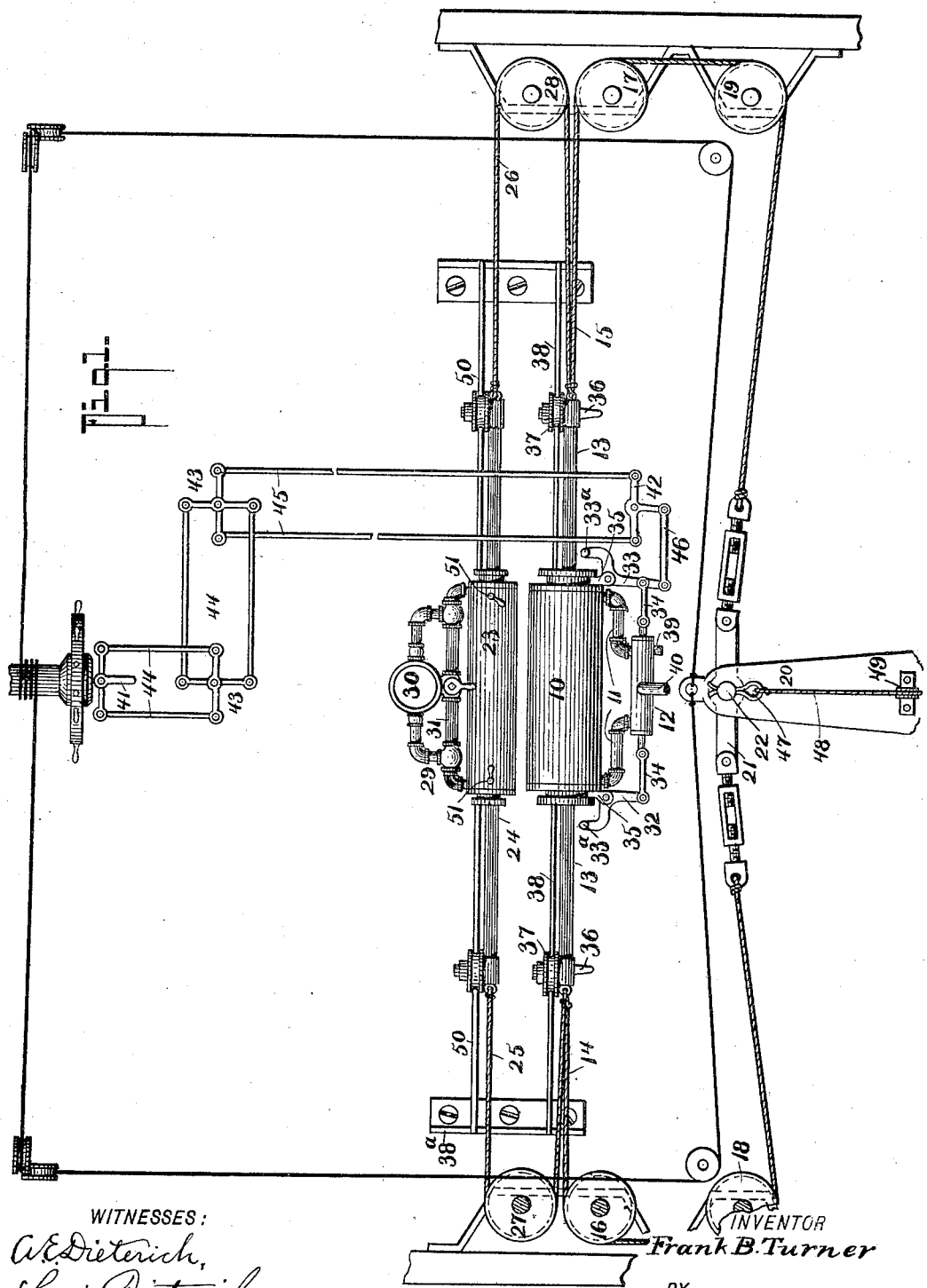
WITNESSES:
INVENTOR
Frank B. Turner
BY
Fred G. Dieterich
ATTORNEY No. 689,145. Patented Dec. 17, 1901.
F. B. TURNER.
ENGINE FOR STEERING VESSELS.
(Application filed Apr. 16, 1901.)
(No Model.) 2 Sheets—Sheet 2.
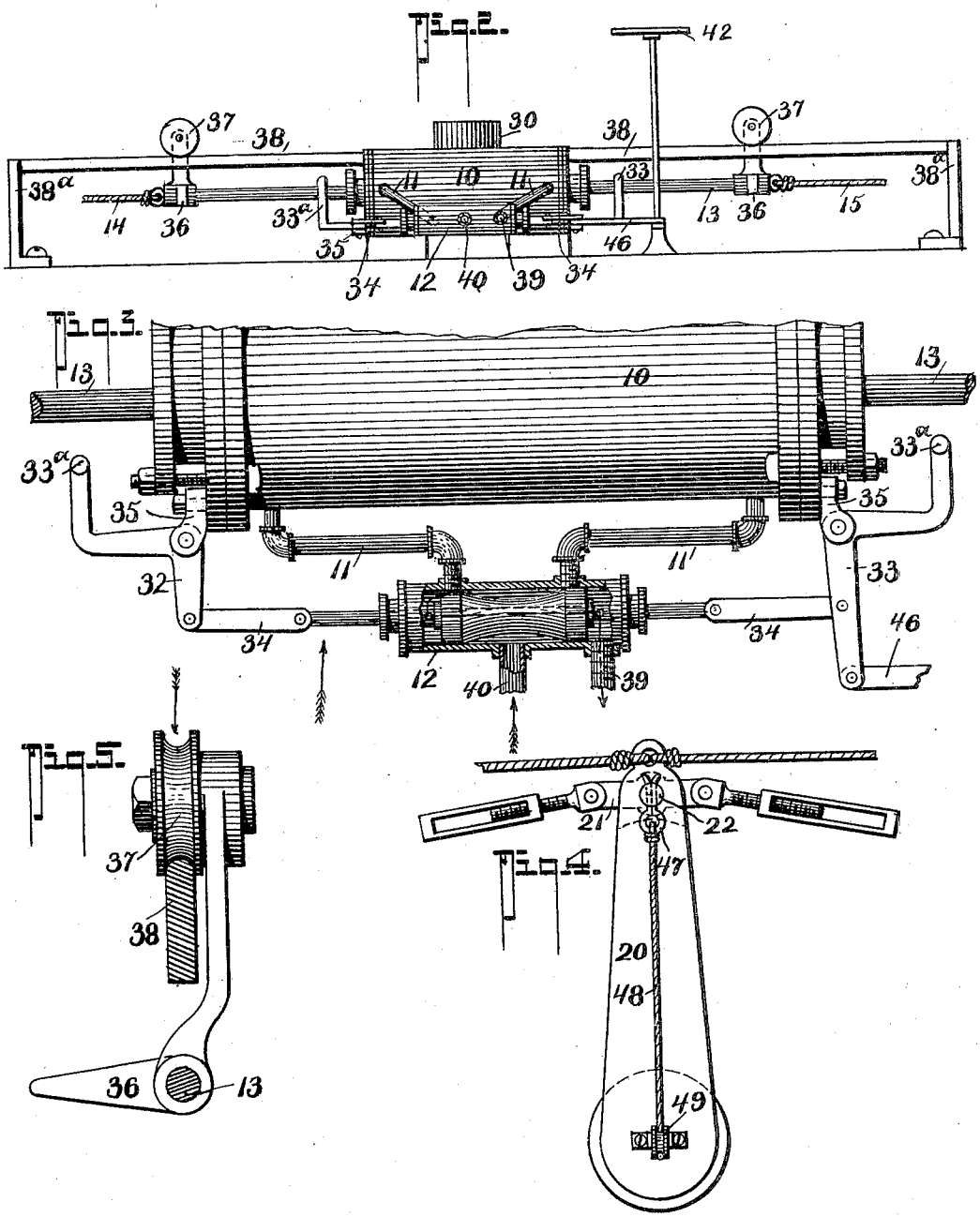
WITNESSES:
INVENTOR
Frank B. Turner
BY
Fred G. Dieterich
ATTORNEY

UNITED STATES PATENT OFFICE.

FRANK BROCKWAY TURNER, OF VANCOUVER, CANADA.

ENGINE FOR STEERING VESSELS.

SPECIFICATION forming part of Letters Patent No. 689,145, dated December 17, 1901.

Application filed April 16, 1901. Serial No. 56,138. (No model.)

*To all whom it may concern:*

Be it known that I, FRANK BROCKWAY TURNER, a citizen of the Dominion of Canada, residing at Vancouver, in the Province of British Columbia, Canada, have invented a new and useful Engine for Steering Vessels, of which the following is a specification.

My invention relates to improvements in the steering-gear of steam vessels, it being a further improvement on Patent of the United States No. 394,314, dated December 11, 1888, and Patent of the Dominion of Canada No. 61,140, dated September 8, 1898, issued to me; and its object is to so improve the general arrangement of such parts and to modify and simplify the construction referred to in said patents that its cost will be reduced and a much more efficient machine will be provided. I accomplish this object by the mechanism illustrated in the accompanying drawings, in which—

Figure 1 shows a general plan of the construction and arrangement of my improved steering-gear. Fig. 2 is an elevation showing arrangement of piston-rod carriers. Fig. 3 shows the arrangement of my improved means of automatically operating the reversing-valve. Fig. 4 shows the means for cutting out the power steering-gear when it is necessary or desirable to steer by hand, and Fig. 5 shows one of the automatic tripping devices and piston-rod supports.

Similar numerals refer to similar parts throughout the several views.

10 indicates a steam-cylinder arranged abeam and centrally of the vessel and at a suitable distance forward of the tiller. This cylinder is connected at opposite ends by a pipe 11, having at its center an ordinary piston-valve 12 with inlet and exhaust ports provided.

Arranged in the cylinder 10 is a piston having a rod 13 passing through glands at opposite ends of said cylinder and extending therethrough about half the length of the cylinder when the piston is amidships. Secured to the opposite ends of this rod 13 are cables 14 and 15, which pass around sheaves 16 and 17, suitably journaled, with their peripheries tangent with the alinement of the rod 13, and around like sheaves 18 and 19, journaled on the opposite sides of the tiller 20 and having their ends connected to said tiller by a link 21, which is held in a pivoted manner by a bolt 22.

Arranged in close proximity and parallel to the cylinder 10 is a cylinder 23, having a rod 24 passing therethrough and a piston fixed at its center. The opposite ends of this rod 24 are connected with the opposite ends of the rod 13 by cables 25 and 26, passing around sheaves 27 and 28, arranged with their peripheries in proximity with the sheaves 16 and 17, so that the pull on the rod 13 will be in line therewith, there being two cables secured to the opposite ends of the rods 13.

The cylinder 23 has a pipe 29, connecting its opposite ends with a centrally-arranged tank 30, from which is supplied the oil to act as a resisting body to the moving piston within the cylinder. On opposite sides of said tank 30, arranged within the pipe 29, are check-valves, these being of the ordinary pattern allowing the oil to flow outward only.

The pipe 29 is connected on the escape sides of the check-valves by a pipe 31, in which there is arranged a cock, the object of this being to allow the piston-head to force the oil from one end of the cylinder to the other in a given time, and thus regulate the movement of the steam-forced piston in the cylinder 10, and consequently the movement of the rudder.

The rod of the piston-valve 12 projects through the opposite ends thereof (see Fig. 3) and is connected with bell-crank levers 32 and 33 by links 34, which are fulcrumed to brackets 35, secured to the front rims of the cylinder 10. The inner ends of these bell-crank levers are provided with projecting ends 33ª, which lie close to the rod 13, on the ends of which are rigidly fixed tripping devices 36. (See Fig. 5.) The support-stems of these tripping devices are provided with idler grooved wheels 37, which travel along support-rails 38, and thus the projecting ends of the piston-rod are prevented from bending with weight when fully extended. The inner ends of these rails 38 are fixed to the ends of the cylinder 10, and their outer ends are supported on suitable brackets 38ª. As each tripping device is brought in contact with the portion 33ª on the lever 33 by the passing of the piston to one end of the cylinder the ports in the valve 12 will be reversed and the piston will be returned. The reversing of the valve 12 will be better understood by examination of Fig. 3. For example, when the piston in said valve is thrown to right the steam will pass, as per arrow, to right end of cylinder 10, through pipe 11, and exhaust from the opposite pipe 11, pass along the stem through center of valve to exhaust or waste-pipe 39, and when reversed the exhaust is through pipe 11 at right direct to said waste 39; but when the valve is amidships steam is given equally from inlet 40 to pipes 11.

The outer end of the bell-crank lever 33 projects beyond its connection with the link 34, and this communicates with a lever 41 beneath the tiller-wheel in the pilot-house through the medium of cross-levers 42 and 43 and rods 44, 45, and 46, so that when said lever 41 is pushed to right or left the steam will have access to the desired end of the piston in the cylinder 10.

In the event of it being desirous to dispense with the power steering-gear and use the hand-gear, as shown, I provide a loose key 47 through the pin or bolt 22, which can be withdrawn by a line 48, passing over a sheave 49 near the rudder-stock and to the pilot-house, and which will at once disconnect the link 21 from the tiller.

Support-guides 50 are provided for the ends of the piston-rod 24 similar to the supports on the rod 13 and for the same reason. (See Fig. 1.)

51 indicates a small petcock in the upper side of the cylinder 23 for the air to escape in the act of filling same with oil.

From the foregoing it is manifest that my invention is a step forward in the art of vessel-steering and is well designed to provide a safe and efficient means of steering with a minimum of labor.

Having thus described my invention, what I claim as new over the old state of the art is—

1. In a steam steering-gear of the character described, the combination with the parallelly-disposed steam and oil cylinders, the piston-rods which are adapted to connect with the tiller of a ship; of a valve mechanism disposed between and having communication with the opposite ends of the steam-cylinder, lever devices connected to the opposite piston ends of the said valve, and devices on the opposite ends of the piston-rod of the steam-cylinder for engaging the said lever devices, for the purposes described.

2. In combination with steam and oil cylinders having pistons whose rods project through each end and communicate with the tiller of a ship; means for supporting the projected ends of said rods, consisting of rails 38 and 50 arranged on a plane above the same, and devices secured to the ends of said rods having sheaves mounted thereon designed to travel along the upper sides of said rails.

3. In combination with steam and oil cylinders having pistons therein with rods extending through their both ends; a piston-valve arranged midway between the ends of the steam-cylinder; bell-crank-lever mechanism connected with said piston-valve and fulcrumed near each end of the cylinder, and devices fixed on the projecting ends of the piston-rod within said cylinder for engaging the bell-crank-lever mechanism and thereby moving the piston-valve and reversing the inflow of steam.

4. In combination with a steering-gear of the class described, having its cable fixed to the tiller by a pin 22 passing through a link 21; a detachable key 47 passed through said pin, and a line attached to such key passing rearward around a pulley fixed at the axis of the rudder-stock, and thence to pilot-house.

5. In combination with steam and oil cylinders having pistons therein and rods passing through and projecting beyond each end thereof; sheaves 16 and 17 arranged with their forward peripheries in line with the rod within the steam-cylinder, and sheaves 27 and 28 arranged with their peripheries, rear and forward, in line with the rod in steam-cylinder, and rod in the oil-cylinder respectively; cables 14 and 15 connecting with the opposite ends of rod in steam-cylinder, passing around sheaves 16 and 17 to tiller; and cables 25 and 26 passing around sheaves 27 and 28, and connecting with the opposite ends of the rods in the steam and oil cylinders, substantially as specified.

In testimony whereof I have signed my name to this specification in the presence of two subscribing witnesses.

FRANK BROCKWAY TURNER.

In presence of—
 W. G. TRETHEWEY,
 ROWLAND BRITTAIN.